US010248628B2

United States Patent
Hassan

(10) Patent No.: US 10,248,628 B2
(45) Date of Patent: Apr. 2, 2019

(54) STATISTICAL APPROACH FOR TESTING MULTIPLE VERSIONS OF WEBSITES

(71) Applicant: Hybris AG, Zug (CH)

(72) Inventor: Ahmad Hassan, Belfast (GB)

(73) Assignee: Hybris AG, Zug (CH)

( * ) Notice: Subject to any disclaimer, the term of this patent is extended or adjusted under 35 U.S.C. 154(b) by 0 days.

(21) Appl. No.: 15/677,744

(22) Filed: Aug. 15, 2017

(65) Prior Publication Data

US 2019/0057104 A1   Feb. 21, 2019

(51) Int. Cl.
| | | |
|---|---|---|
| G06Q 30/06 | (2012.01) | |
| G06Q 30/00 | (2012.01) | |
| G06F 17/30 | (2006.01) | |
| G06F 16/958 | (2019.01) | |
| G06F 11/36 | (2006.01) | |
| G06F 16/957 | (2019.01) | |

(52) U.S. Cl.
CPC ........ *G06F 16/958* (2019.01); *G06F 11/3688* (2013.01); *G06F 16/9577* (2019.01); *G06F 11/368* (2013.01); *G06F 16/957* (2019.01); *G06F 16/9574* (2019.01)

(58) Field of Classification Search
CPC ............. G06F 11/3688; G06F 17/3089; G06F 17/30899; G06F 17/30705; G06F 17/2247; G06F 17/30867; G06F 17/3053; G06F 17/30719; G06F 11/328; G06F 21/316; G06F 17/30902
See application file for complete search history.

(56) References Cited

U.S. PATENT DOCUMENTS

| | | | | |
|---|---|---|---|---|
| 8,620,745 | B2* | 12/2013 | You ..................... | G06F 17/3089 705/14.4 |
| 8,744,883 | B2* | 6/2014 | Roy .................. | G06F 17/30705 705/7.11 |
| 9,928,526 | B2* | 3/2018 | Dereszynski ...... | G06Q 30/0254 |
| 2004/0059626 | A1* | 3/2004 | Smallwood ............ | G06Q 30/02 705/7.29 |
| 2005/0159921 | A1* | 7/2005 | Louviere ................ | G06Q 30/02 702/181 |
| 2005/0246410 | A1* | 11/2005 | Chen ................. | G06F 17/30719 709/200 |
| 2008/0046562 | A1* | 2/2008 | Butler ................. | G06F 17/3089 709/224 |

(Continued)

OTHER PUBLICATIONS

Martin Ester et al., Accurate and Efficient Crawling for Relevant Websites, 2004, [Retrieved on Jan. 11, 2019]. Retrieved from the internet: <URL: http://vldb.org/conf/2004/RS10P3.PDF > 12 Pages. (396-407) (Year: 2004).*

(Continued)

*Primary Examiner* — Anibal Rivera
(74) *Attorney, Agent, or Firm* — Fish & Richardson P.C.

(57) ABSTRACT

Methods, systems, and computer-readable storage media for selection of a version of a website from multiple versions of the website, implementations including receiving user interaction data representative of user interactions with respective versions of a website, for each version of the website, determining a posterior distribution, selecting a version of the website based on the posterior distributions, and hosting the version of the website on one or more servers.

20 Claims, 6 Drawing Sheets

(56) References Cited

U.S. PATENT DOCUMENTS

| | | | | |
|---|---|---|---|---|
| 2008/0162699 | A1* | 7/2008 | Gaffney | H04L 67/02 709/226 |
| 2009/0030859 | A1* | 1/2009 | Buchs | G06F 17/30899 706/19 |
| 2010/0100419 | A1* | 4/2010 | Natoli | G06Q 30/02 705/7.31 |
| 2010/0121624 | A1* | 5/2010 | Roy | G06F 17/3089 703/6 |
| 2010/0251128 | A1* | 9/2010 | Cordasco | G06F 11/328 715/736 |
| 2011/0087647 | A1* | 4/2011 | Signorini | G06F 17/30867 707/709 |
| 2011/0196733 | A1* | 8/2011 | Li | G06Q 30/02 705/14.42 |
| 2011/0213655 | A1* | 9/2011 | Henkin | G06Q 30/00 705/14.49 |
| 2012/0191531 | A1* | 7/2012 | You | G06F 17/3089 705/14.42 |
| 2013/0117358 | A1* | 5/2013 | Ricard | G06F 21/316 709/203 |
| 2013/0144854 | A1* | 6/2013 | Pantel | G06F 17/30867 707/706 |
| 2013/0268841 | A1* | 10/2013 | Kummer | G06F 17/2247 715/234 |
| 2014/0215008 | A1* | 7/2014 | Wiles | G06F 17/30902 709/217 |
| 2015/0074650 | A1* | 3/2015 | Bennett | G06F 11/3688 717/125 |
| 2015/0254328 | A1* | 9/2015 | Dereszynski | G06Q 30/0277 707/739 |
| 2015/0356658 | A1* | 12/2015 | Morris | G06Q 30/0631 705/26.7 |
| 2016/0077672 | A1* | 3/2016 | Anderson | G06F 3/0481 715/234 |
| 2016/0217385 | A1* | 7/2016 | Choi | G06N 7/005 |
| 2016/0350802 | A1* | 12/2016 | Mehanian | G06Q 30/0254 |
| 2017/0098240 | A1* | 4/2017 | Yang | G06N 7/005 |
| 2017/0140053 | A1* | 5/2017 | Vorobev | G06F 17/3053 |
| 2017/0168924 | A1* | 6/2017 | Dereszynski | G06F 11/3688 |
| 2017/0300966 | A1* | 10/2017 | Dereszynski | G06Q 30/0254 |
| 2017/0351772 | A1* | 12/2017 | Pantel | G06F 17/30867 |
| 2018/0004717 | A1* | 1/2018 | Anderson | G06F 3/0481 |
| 2018/0004856 | A1* | 1/2018 | Levi | G06F 17/3089 |

OTHER PUBLICATIONS

Olivier Chapelle et al., A Dynamic Bayesian Network Click Model for Web Search Ranking, Apr. 20-24, 2009, [Retrieved on Jan. 11, 2019]. Retrieved from the internet: <URL: http://olivier.chapelle.cc/pub/DBN_www2009.pdf> 10 Pages. (1-10) (Year: 2009).*
U.S. Appl. No. 14/704,461, Ahmad Hassan, filed May 5, 2015.
U.S. Appl. No. 14/831,567, Ahmad Hassan, filed Aug. 20, 2015.
U.S. Appl. No. 14/831,624, Ahmad Hassan, filed Aug. 20, 2015.
U.S. Appl. No. 15/213,621, Ahmad Hassan, filed Jul. 19, 2016.
U.S. Appl. No. 15/213,626, Ahmad Hassan, filed Jul. 19, 2016.
U.S. Appl. No. 15/213,654, Ahmad Hassan, filed Jul. 19, 2016.
U.S. Appl. No. 15/213,674, Ahmad Hassan, filed Jul. 19, 2016.
U.S. Appl. No. 15/213,754, Ahmad Hassan, filed Jul. 19, 2016.
U.S. Appl. No. 15/213,816, Ahmad Hassan, filed Jul. 19, 2016.
U.S. Appl. No. 15/213,861, Ahmad Hassan, filed Jul. 19, 2016.
U.S. Appl. No. 15/213,930, Ahmad Hassan, filed Jul. 19, 2016.
U.S. Appl. No. 15/213,960, Ahmad Hassan, filed Jul. 19, 2016.
U.S. Appl. No. 15/214,019, Ahmad Hassan, filed Jul. 19, 2016.
U.S. Appl. No. 15/214,082, Ahmad Hassan, filed Jul. 19, 2016.
U.S. Appl. No. 15/214,102, Ahmad Hassan, filed Jul. 19, 2016.

* cited by examiner

STATISTICAL APPROACH FOR TESTING MULTIPLE VERSIONS OF WEBSITES

BACKGROUND

Websites seek to attract users. Overtime, a website can evolve as design and style preferences, and technologies evolve. As a website changes, website operators seek to maintain, or improve website traffic. To evaluate website changes, A-to-B (AB) testing, and Thompson sampling are common techniques to determine which version of the website provides a higher number of visitors. However, approaches, such as AB testing, and Thompson sampling, are restricted to only a limited number of versions, and limited number of factors affecting the visitors on a web page. For example, in the existing Bayesian approach of Thomson sampling, the distribution of the sample only considers a maximum two likelihoods of an existing version.

SUMMARY

Implementations of the present disclosure are generally directed to evaluating versions of websites. More particularly, implementations of the present disclosure are directed to Bayesian framework that includes prior and posterior distribution models to model and test multiple versions of a website, and identify a version as a best version based on respective posterior distributions. In some implementations, actions include receiving user interaction data representative of user interactions with respective versions of a website, for each version of the website, determining a posterior distribution, selecting a version of the website based on the posterior distributions, and hosting the version of the website on one or more servers. Other implementations of this aspect include corresponding systems, apparatus, and computer programs, configured to perform the actions of the methods, encoded on computer storage devices.

These and other implementations can each optionally include one or more of the following features: the user interaction data is representative of user interactions with respective versions of web pages of the respective versions of the website; actions further include programming each version of the website with computer-executable code to record the user interactions as the user interaction data; actions further include transmitting, from each version of the website, the user interaction data to a stream processor engine that performs incremental aggregation on the user interaction data; the posterior distribution is based on a prior distribution; each posterior distribution represents probabilities of a click conversion rate of a respective version; and at least a portion of the user interaction data represents user clicks on respective versions of the website.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
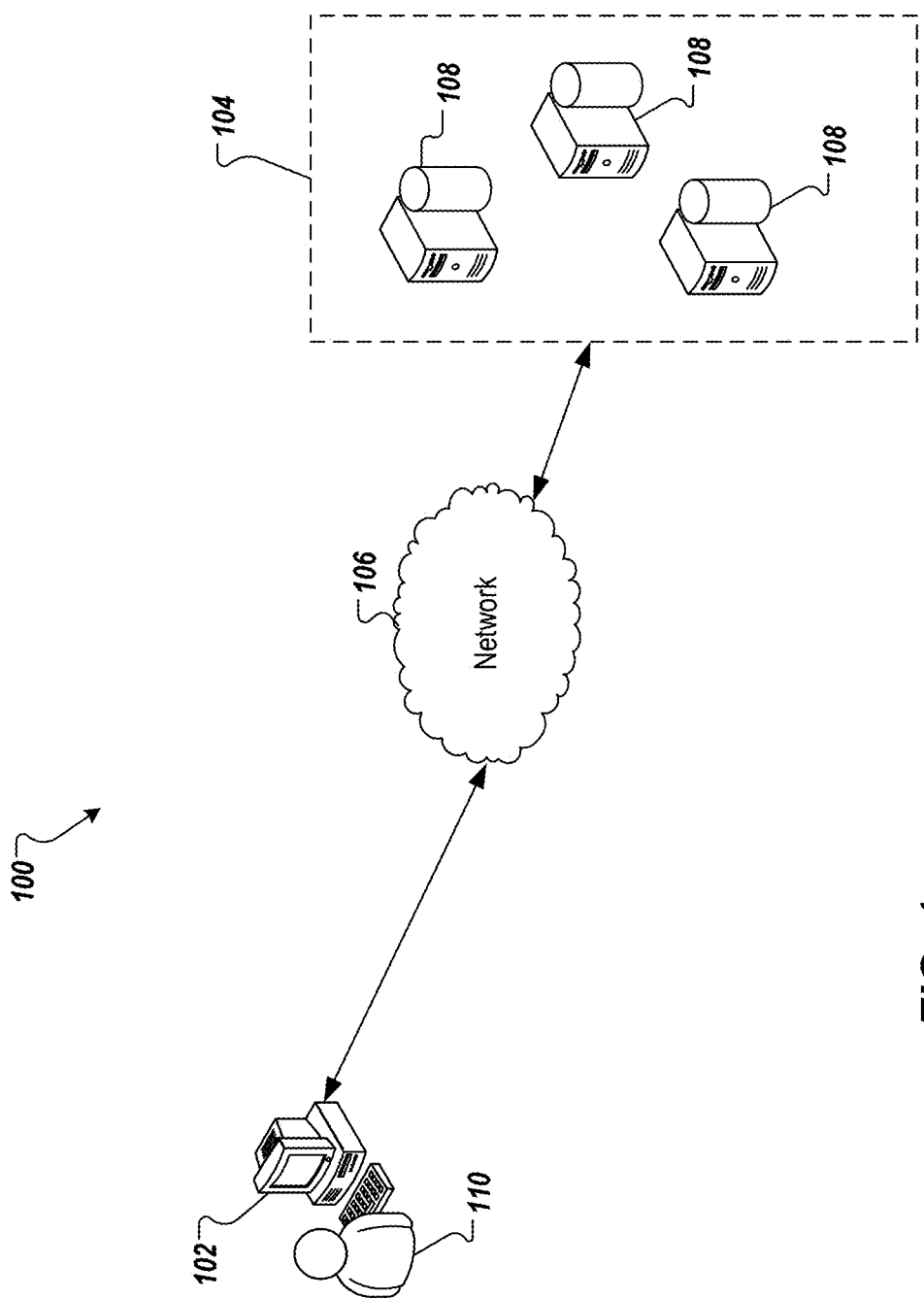
FIG. 1 depicts an example architecture that can be used to execute implementations of the present disclosure.

Implementations of the present disclosure are generally directed to evaluating versions of websites. More particularly, implementations of the present disclosure are directed to Bayesian framework that includes prior and posterior distribution models to model and test multiple versions of a website, and identify a version as a best version based on respective posterior distributions. Implementations can include actions of receiving user interaction data representative of user interactions with respective versions of a website, for each version of the website, determining a posterior distribution, selecting a version of the website based on the posterior distributions, and hosting the version of the website on one or more servers.

To provide context for implementations of the present disclosure, A-to-B (AB) testing is a relatively simple and popular technique for testing several different versions of a website (e.g., web pages of a website) with live traffic. AB testing provides a relatively quick and efficient way to increase conversion rates (e.g., rates, at which visitors of a website convert into customers, in an e-commerce context). In other words, AB testing can be used to determine a website version that increases the likelihood of increasing the number of orders placed through the website. However, AB testing can only be used to test a limited number of factors affecting different versions of the website. Another technique, referred to as Thompson sampling, enables various factors of a website to be tested by extending a Bayesian framework (including Bayesian models) with generalized linear models. The Bayesian framework enables web page factors (e.g., interface color, interface location, font), as well as temporal factors (e.g., whether the website is more effective when accessed in the morning, or in the evening) to be tested to determine the most effective combination of factors. Such factors can be embedded into the Bayesian framework through posterior distributions. However, approaches, such as AB testing, and Thompson sampling, are restricted to only a limited number of versions, and limited number of factors affecting the visitors on a web page.

In view of the foregoing, implementations of the present disclosure provide a generalized Bayesian framework that includes prior and posterior distribution models to model k versions of a website, where n visitors access some segment (e.g., web page) of each of the k versions. In some examples, the Bayesian framework is based on the Bayes Theorem, which models the conditional probability between random variables. For example, the Bayesian framework uses Bayes Theorem to model conditional probabilities between random events A and B to derive more precise results based on gathered evidence. In some examples, the Bayesian framework models cause-effect relationships as a directed acyclic graph where the effect of parent node is shown as a child node, and edges represents the conditional probability of the child node due to the parent node. The Bayesian framework represents the inter-relationships between events and facilitate predictive modeling based on past events using a posterior probability distribution.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106. In accordance with implementations of the present disclosure, the server system 104 can host the extended Bayesian framework for evaluating versions of websites, as described herein.

Figure 2:
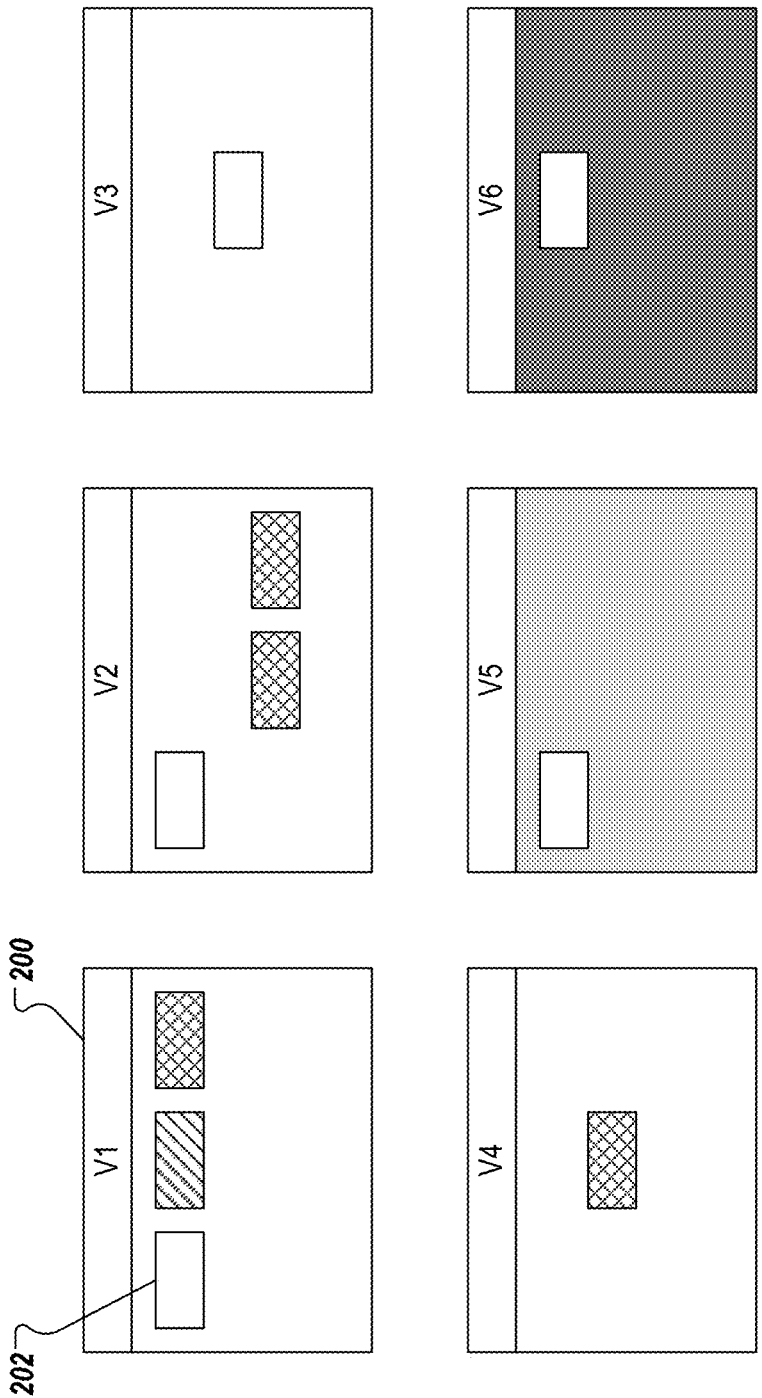
FIG. 2 depicts example versions of a web page of a website.

FIG. 2 depicts example versions of a web page of a website. A website can include a collection of web pages. The design, font, user interface (UI) types and locations, and the general aesthetic of a web page impacts the effectiveness of the web page, individually, and the website as a whole.

The effectiveness of a web page can be determined based on conversion rates. In an e-commerce context, a conversion rate, is a rate at which visitors of a website convert into customers (e.g., purchase something through the website).

In the example of FIG. 2, each web page 200 has one or more elements 202. Example elements can include UIs (e.g., drop-down menu, dialogue box, button), images, text blocks, and the like. Each version includes a respective combination of elements, font types/sizes/colors, background colors, foreground colors, and the like. The example of FIG. 2 depicts six versions (k=6) of an example web page of an example website. The examples of FIG. 2 are relatively simplistic for purposes of illustrating implementations of the present disclosure. It is contemplated, however, that implementations of the present disclosure can be utilized with any appropriate versions of any number of web pages.

Figure 3:
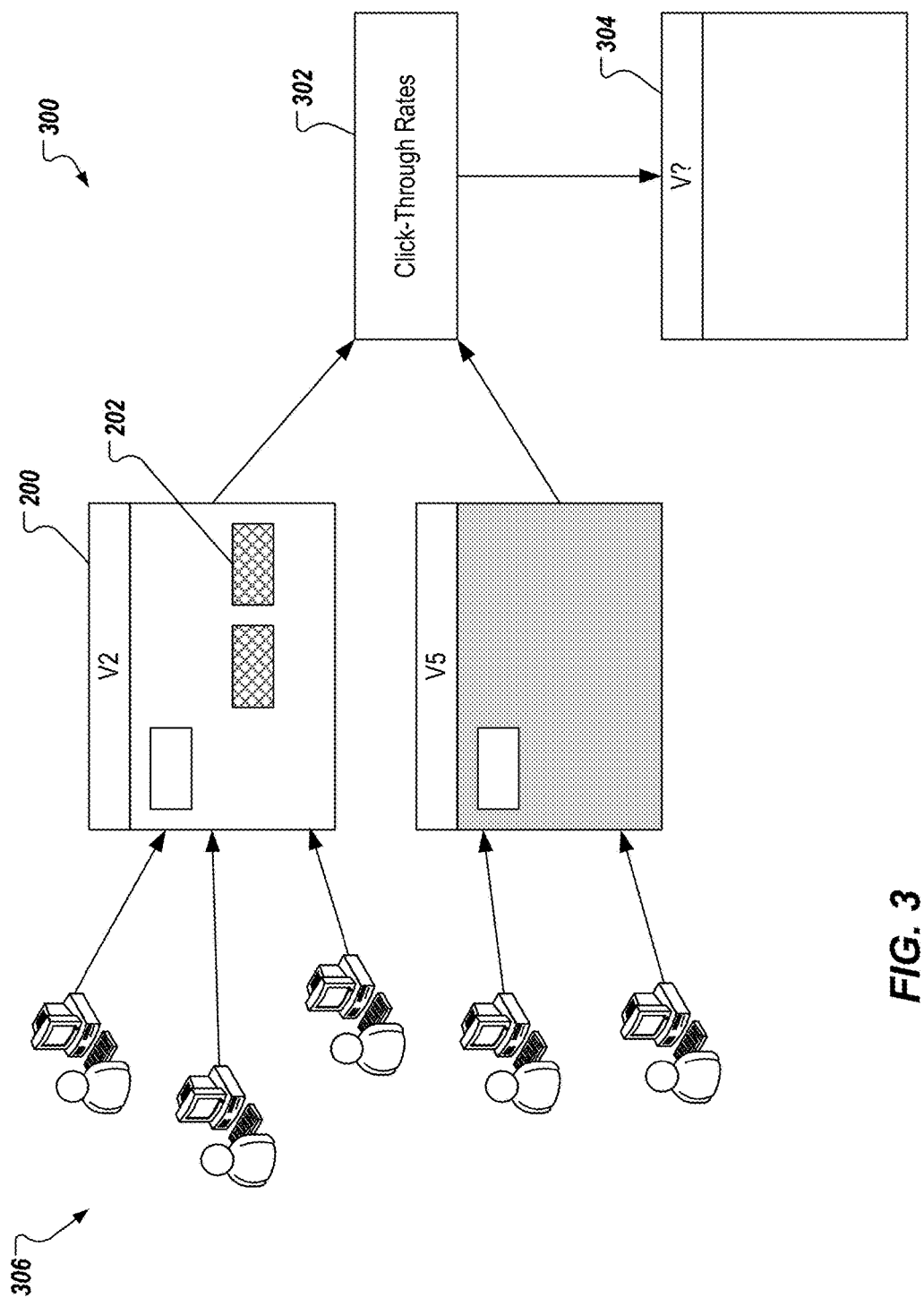
FIG. 3 depicts a conceptual diagram in accordance with implementations of the present disclosure.

FIG. 3 depicts a conceptual diagram 300 in accordance with implementations of the present disclosure. In the example of FIG. 3, two versions of the web pages 200 of FIG. 2 are compared to determine which version is a better version for improving click-through rates 302. In short, to determine which version is a best version 304, in terms of click-through rate. As depicted in FIG. 3, a collection of users 306 interact with the versions of the web pages, some users converting (e.g., purchasing an item through the web page).

As introduced above, implementations of the present disclosure provide a generalized Bayesian framework that includes prior and posterior distribution models to model k versions of a website, where n visitors access some segment of each of the k versions (e.g., k versions). According to the Bayes rule, the following relationship is provided:

$$P(A|B) = \frac{P(A \cap B)P(A)}{P(B)}$$

where A and B are two random events, and A exists, only if B exists.

In accordance with implementations of the present disclosure, the page views of respective versions of a web page are provided as $P(n_1), P(n_2), \ldots, P(n_k)$, respectively, where n is the total number of visitors to the website under consideration. A multinomial sampling distribution for the k versions of the website is provided as:

$$f(n_1, n_2, \ldots, n_k) = \frac{n!}{n_1! * n_2! * \ldots * n_k!} * (\theta_1^{n_1}, \theta_1^{n_2}, \ldots, \theta_1^{n_k})$$

where $\theta_i$ is the probability of visitor $n_i$ visiting a web page. This relationship can be formulated as:

$$f(\theta_1, \theta_2, \ldots, \theta_k) = \prod_{i=0}^{k} \frac{n!}{n_i!} * (\theta_i)^{n_i}$$

A prior probability distribution (prior distribution) is provided, and can be described as a probability distribution that expresses an estimate about an unknown quantity before some evidence is considered. For example, and in the context of the present disclosure, the prior distribution is the probability distribution representing the relative proportions of visitors who will click on a version of a web page (e.g., provide an indication of conversion intent). In accordance with implementations of the present disclosure, the prior distribution for k versions is provided as:

$$f_{\alpha 1 * \alpha 2 * \ldots * \alpha k}(\theta_1, \theta_2, \ldots, \theta_k) = \frac{\theta_1^{\alpha 1}, \theta_2^{\alpha 2}, \ldots, \theta_k^{\alpha k}}{\beta(\alpha_1, \alpha_2, \ldots, \alpha_k)}$$

where α and β are respective shape parameters. A posterior probability distribution (posterior distribution) is provided, and can be described as a distribution of possible unobserved values conditional on observed values. For example, and in the context of the present disclosure, the posterior distribution is the probability distribution representing the relative proportions of visitors who will convert based on clicking on a version of a web page. In accordance with implementations of the present disclosure, the posterior distribution for k versions is derived from a sampling distribution and the prior distribution. A resulting beta distribution is provided as:

$$f(\theta_{i(i=1,\ldots,k)} | n_1, n_2, \ldots, n_k, n) = \frac{\theta^{n1+\alpha 1-1}, \theta^{n2+\alpha 2-1}, \ldots, \theta^{nk+\alpha k-1}}{\beta(n_1 + \alpha_1, n_2 + \alpha_2, \ldots, n_k + \alpha_k)}$$

According to implementations of the present disclosure, the posterior distribution is another beta distribution, and is provided as:

$$f(\theta_{i(i=1,\ldots,k)} | n_1, n_2, \ldots, n_k, n) = f(n_1+\alpha_1, n_2+\alpha_2, \ldots, n_k+\alpha_k)(\theta_1, \theta_2, \ldots, \theta_k)$$

where the following conditions are provided:

$$\Sigma_{i=1}^{k} n_i = n, \text{ and } \Sigma_{i=1}^{k} \theta_i = 1$$

In accordance with implementations of the present disclosure, the prior distribution model and the posterior distribution model are used to model and test k versions of a website (e.g., a web page of a website), where n visitors is the sample size to conduct AB testing. As a result, the best version is identified as the version with the highest number of page views and conversion rate based on the respective posterior distributions.

Figure 4:
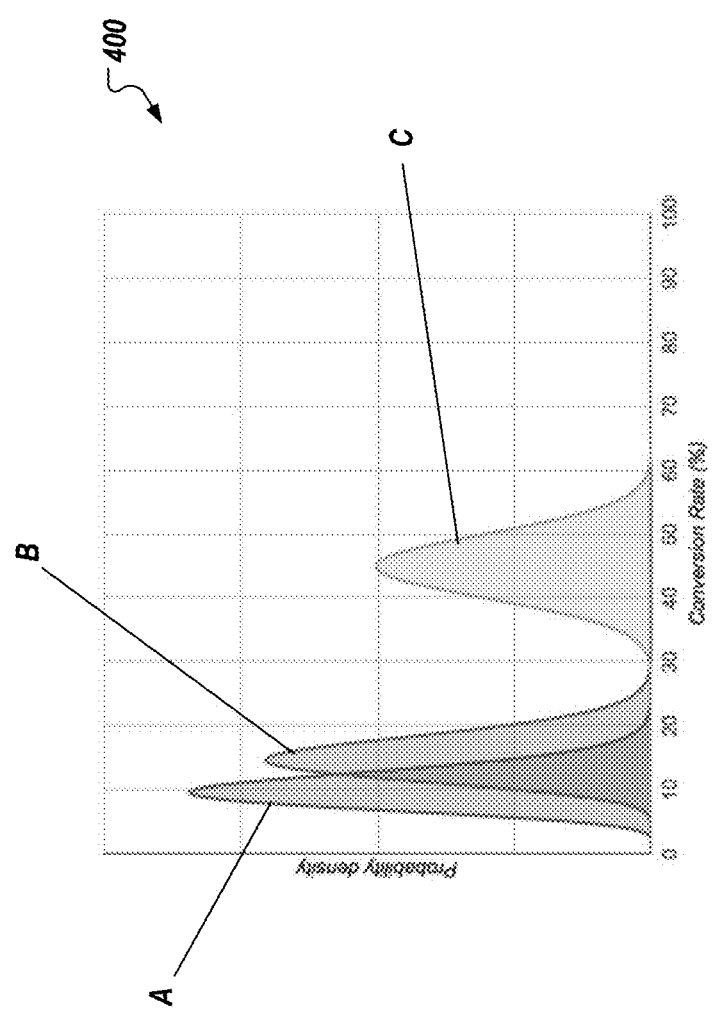
FIG. 4 depicts example posterior distributions for example versions of a web page.

FIG. 4 depicts example posterior distributions 400 for example versions of a web page (e.g., k=3). More particularly, the data underlying FIG. 4 is based on merchandising data, where a number of users access different types of e-commerce web pages, and their interest in products is determined through product intent clicks or product purchase clicks that are logged. Javascript is embedded within each web page, which is executable to collect the data, and transmit the data to a stream processor engine. An example stream processor engine includes Apache Flink provided by The Apache Software Foundation, which performs incremental aggregates on the incoming input stream on an event-by-event basis. The data is processed using the models of the present disclosure to provide respective posterior distributions for the web pages.

FIG. 4 provides a graph 400 of posterior distributions of three web page versions A, B, and C. The example of FIG. 4 is based on experiments conducted for 100 users, which either click on the respective web page, or do nothing. As seen from the graph of FIG. 4, for version A, there is a 95% chance that the click conversion rate will be between 5% and 17%. Similarly, for version B, the conversion rate is between 9% and 23% for 95% of the accesses. The best version, however, is version C, where the conversion rate of 33% to 55% is observed for 95% of the cases. Accordingly, implementations of the present disclosure enable a web page version to be precisely identified as the best version through statistical modelling.

Figure 5:
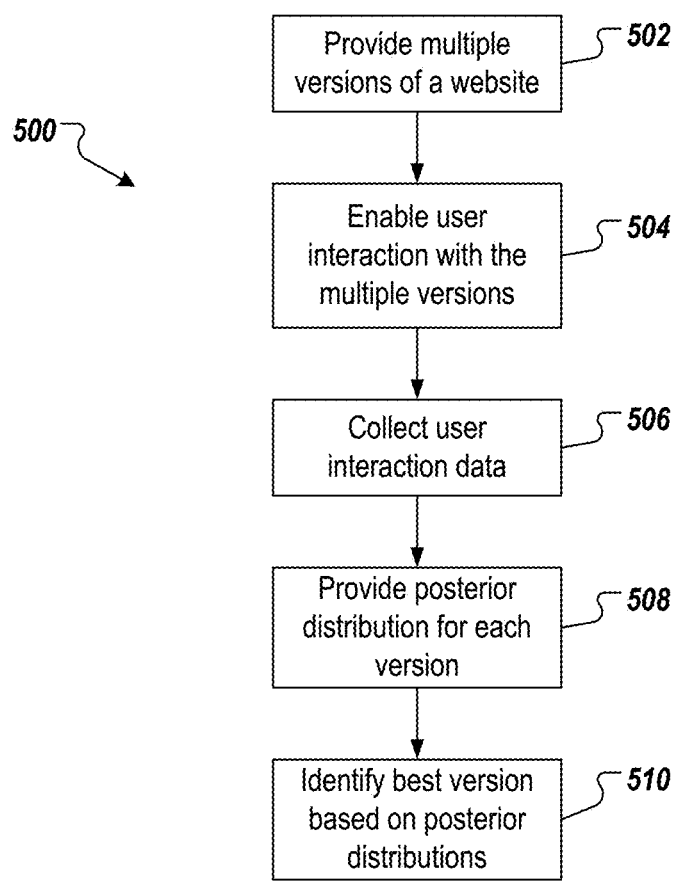
FIG. 5 an example process that can be executed in accordance with implementations of the present disclosure.

FIG. 5 depicts an example process 500 that can be executed in accordance with implementations of the present disclosure. In some examples, the example process 500 can be provided by one or more computer-executable programs executed using one or more computing devices. The example process 500 can be performed to identify a version of multiple versions of a website as the best version.

Multiple versions of a website are provided (502). For example, multiple versions of the website can be developed, and one or more web pages within each version of the website can be programmed with computer-executable code (e.g., Javascript) that is responsive to user interaction with the web page. In some examples, computer-executable code embedded within each web page is executable to collect user interaction data (e.g., hover overs, clicks), and transmit the user interaction data to a stream processor engine.

User interaction with each of the multiple versions of the website is enabled (504). In some examples, each version of the website is hosted on one or more servers, and is made available for user interaction therewith. In some examples, the multiple versions of the website are made available to the public (e.g., any user can use any appropriate client-side device to interact with a version of the website). In some examples, access to one or more versions of the website may be limited to a sub-set of users (e.g., a test group). In this manner, the various versions of the website can be tested before the website is publicly available. User interaction data is collected (506). In some examples, and as described herein, user interactions with the respective versions of the website are captured as user interaction data, which is provided to a stream processor engine.

A posterior distribution is provided for each version of the website (508). In accordance with implementations of the present disclosure, each posterior distribution is provided as:

$$f(\theta_{i(i=1,\ldots,k)} | n_1, n_2, \ldots, n_k, n) = f(n_1+\alpha_1, n_2+\alpha_2, \ldots, n_k+\alpha_k)(\theta_1, \theta_2, \ldots, \theta_k)$$

where n is the total number of users visiting a respective version k of the website, α is a shape parameter, and θ is a probability of one or more users visiting the respective version k of the website. A best version of the website is identified based on the posterior distributions (510). For example, and as described by way of example with reference to FIG. 4 above, a posterior distribution that indicates the highest click-through rate can be identified, and the version of the website corresponding to that posterior distribution can be selected as the best version of the website. In some examples, the best version of the website is hosted on one or more servers. For example, the best version of the website is made available for public access, where users can interact with the website using respective client-side devices.

Implementations of the present disclosure provide one or more of the following example advantages. An example advantage is that implementations of the present disclosure provide a tool to improve product design, such as a website. In some examples, optimization includes which version of the website is best to increase traffic (e.g., which title on the web page attracts more view than other titles). This is a website-specific problem, which the present disclosure addresses using mathematical models that learn from the previous user behavior, and derives a result based on collected knowledge and the future likelihood.

Figure 6:
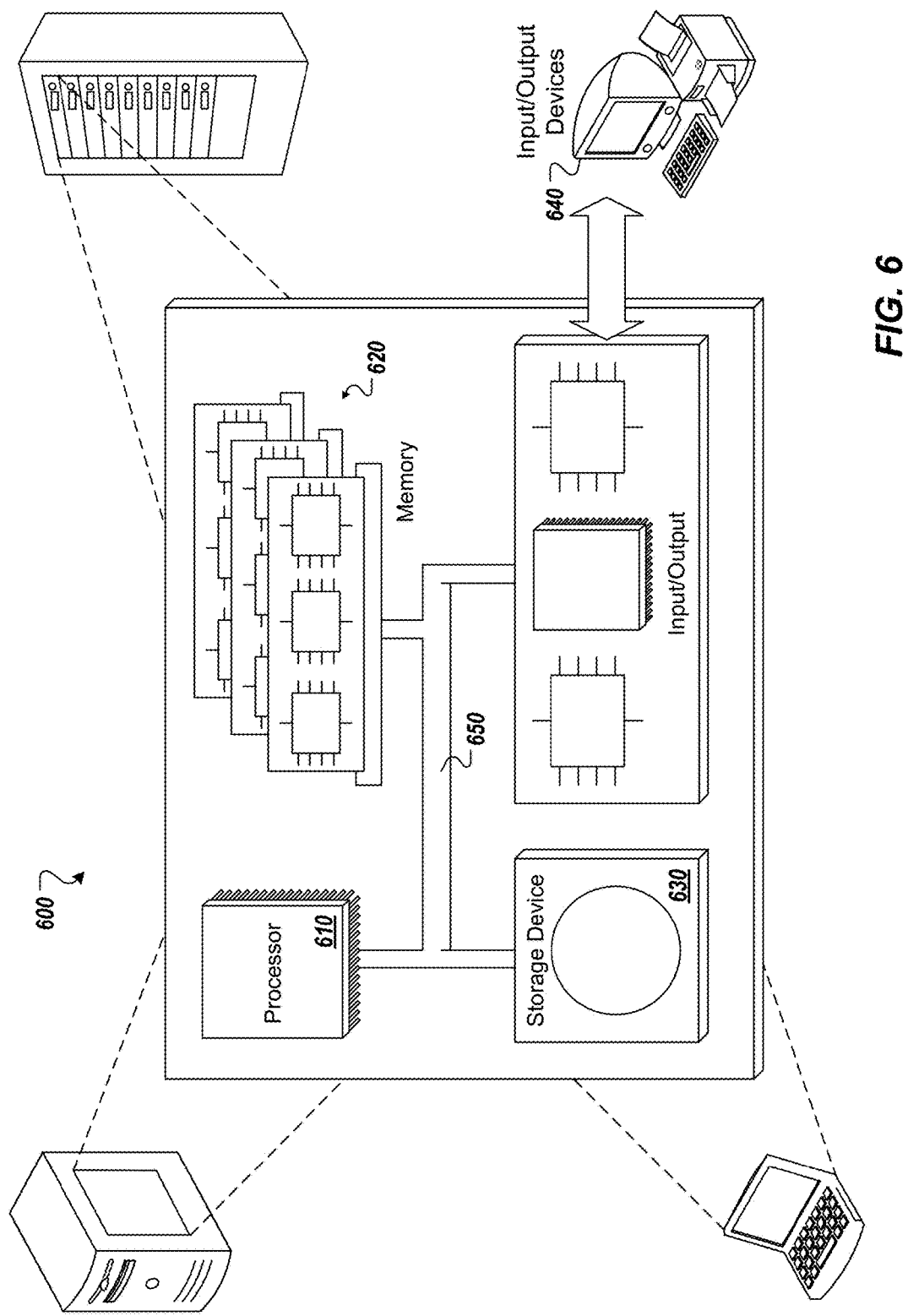
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selection of a version of a website from multiple versions of the website, the method being executed by one or more processors and comprising:

receiving, by the one or more processors, user interaction data representative of user interactions with respective versions of a website;

for each version of the website, determining, by the one or more processors, a posterior distribution as:

$$f(\theta_{i(i=1,\ldots,k)}|n_1,n_2,\ldots,n_k,n) = f(n_1+\alpha_1, n_2+\alpha_2, \ldots, n_k+\alpha_k)(\theta_1, \theta_2, \ldots, \theta_k)$$

where n is the total number of users visiting a respective version k of the website, $\alpha$ is a shape parameter, and $\theta$ is a probability of one or more users visiting the respective version k of the website, and values of $\theta$ for the users are determined as:

$$f(\theta_1, \theta_2, \ldots, \theta_k) = \Pi_{i=0}^{k} \frac{n!}{n_i!} * (\theta_i)^{n_i};$$

selecting, by the one or more processors, a version of the website based on the posterior distributions; and hosting, by the one or more processors, the version of the website on one or more servers.

2. The method of claim 1, wherein the user interaction data is representative of user interactions with respective versions of web pages of the respective versions of the website.

3. The method of claim 1, further comprising programming each version of the website with computer-executable code to record the user interactions as the user interaction data.

4. The method of claim 1, further comprising transmitting, from each version of the website, the user interaction data to a stream processor engine that performs incremental aggregation on the user interaction data.

5. The method of claim 1, wherein the posterior distribution is based on a prior distribution provided as:

$$f_{\alpha 1 * \alpha 2 * \ldots * \alpha k}(\theta_1, \theta_2, \ldots, \theta_k) = \frac{\theta_1^{\alpha 1}, \theta_2^{\alpha 2}, \ldots, \theta_k^{\alpha k}}{\beta(\alpha_1, \alpha_2, \ldots, \alpha_k)}$$

where $\beta$ is a shape parameter.

6. The method of claim 1, wherein each posterior distribution represents probabilities of a click conversion rate of a respective version.

7. The method of claim 1, wherein, at least a portion of the user interaction data represents user clicks on respective versions of the website.

8. A non-transitory computer-readable storage medium coupled to one or more processors and having instructions stored thereon which, when executed by the one or more processors, cause the one or more processors to perform operations for selection of a version of a website from multiple versions of the website, the operations comprising:

receiving user interaction data representative of user interactions with respective versions of a website;

for each version of the website, determining, by the one or more processors, a posterior distribution as:

$$f(\theta_{i(i=1,\ldots,k)}|n_1,n_2,\ldots,n_k,n) = f(n_1+\alpha_1, n_2+\alpha_2, \ldots, n_k+\alpha_k)(\theta_1,\theta_2,\ldots,\theta_k)$$

where n is the total number of users visiting a respective version k of the website, $\alpha$ is a shape parameter, and $\theta$ is a probability of one or more users visiting the respective version k of the website, and values of $\theta$ for the users are determined as:

$$f(\theta_1, \theta_2, \ldots, \theta_k) = \Pi_{i=0}^{k} \frac{n!}{n_i!} * (\theta_i)^{n_i};$$

selecting, by the one or more processors, a version of the website based on the posterior distributions; and hosting the version of the website on one or more servers.

9. The computer-readable storage medium of claim 8, wherein the user interaction data is representative of user interactions with respective versions of web pages of the respective versions of the website.

10. The computer-readable storage medium of claim 8, wherein operations further comprise programming each version of the website with computer-executable code to record the user interactions as the user interaction data.

11. The computer-readable storage medium of claim 8, wherein operations further comprise transmitting, from each version of the website, the user interaction data to a stream processor engine that performs incremental aggregation on the user interaction data.

12. The computer-readable storage medium of claim 8, wherein the posterior distribution is based on a prior distribution provided as:

$$f_{\alpha 1 * \alpha 2 * \ldots * \alpha k}(\theta_1, \theta_2, \ldots, \theta_k) = \frac{\theta_1^{\alpha 1}, \theta_2^{\alpha 2}, \ldots, \theta_k^{\alpha k}}{\beta(\alpha_1, \alpha_2, \ldots, \alpha_k)}$$

where $\beta$ is a shape parameter.

13. The computer-readable storage medium of claim 8, wherein each posterior distribution represents probabilities of a click conversion rate of a respective version.

14. The computer-readable storage medium of claim 8, wherein, at least a portion of the user interaction data represents user clicks on respective versions of the website.

15. A system, comprising:

a computing device; and a computer-readable storage device coupled to the computing device and having instructions stored thereon which, when executed by the computing device, cause the computing device to perform operations for selection of a version of a website from multiple versions of the website, the operations comprising:

receiving user interaction data representative of user interactions with respective versions of a website;

for each version of the website, determining, by the one or more processors, a posterior distribution as:

$$f(\theta_{i(i=1,\ldots,k)}|n_1,n_2,\ldots,n_k,n) = f(n_1+\alpha_1, n_2+\alpha_2, \ldots, n_k+\alpha_k)(\theta_1,\theta_2,\ldots,\theta_k)$$

where n is the total number of users visiting a respective version k of the website, $\alpha$ is a shape parameter, and $\theta$ is a probability of one or more users visiting the respective version k of the website, and values of $\theta$ for the users are determined as:

$$f(\theta_1, \theta_2, \ldots, \theta_k) = \Pi_{i=0}^{k} \frac{n!}{n_i!} * (\theta_i)^{n_i};$$

selecting, by the one or more processors, a version of the website based on the posterior distributions; and hosting the version of the website on one or more servers.

16. The system of claim 15, wherein the user interaction data is representative of user interactions with respective versions of web pages of the respective versions of the website.

17. The system of claim 15, wherein operations further comprise programming each version of the website with computer-executable code to record the user interactions as the user interaction data.

18. The system of claim 15, wherein operations further comprise transmitting, from each version of the website, the user interaction data to a stream processor engine that performs incremental aggregation on the user interaction data.

19. The system of claim 15, wherein the posterior distribution is based on a prior distribution provided as:

$$f_{\alpha 1 * \alpha 2 * \ldots * \alpha k}(\theta_1, \theta_2, \ldots, \theta_k) = \frac{\theta_1^{\alpha 1}, \theta_2^{\alpha 2}, \ldots, \theta_k^{\alpha k}}{\beta(\alpha_1, \alpha_2, \ldots, \alpha_k)}$$

where β is a shape parameter.

20. The system of claim 15, wherein each posterior distribution represents probabilities of a click conversion rate of a respective version.

* * * * *